United States Patent
Kurai

(10) Patent No.: US 10,703,148 B2
(45) Date of Patent: Jul. 7, 2020

(54) TIRE MANAGEMENT METHOD

(71) Applicant: HONDA MOTOR CO., LTD., Tokyo (JP)

(72) Inventor: Kenichiro Kurai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 15/901,258

(22) Filed: Feb. 21, 2018

(65) Prior Publication Data
US 2018/0236829 A1 Aug. 23, 2018

(30) Foreign Application Priority Data
Feb. 22, 2017 (JP) .................................. 2017-031068

(51) Int. Cl.
| | | |
|---|---|---|
| *B29D 30/00* | (2006.01) | |
| *B60C 25/05* | (2006.01) | |
| *B60C 13/00* | (2006.01) | |
| *G01M 17/02* | (2006.01) | |
| *B60C 25/00* | (2006.01) | |

(52) U.S. Cl.
CPC ........ *B60C 25/0554* (2013.01); *B60C 13/001* (2013.01); *B60C 25/007* (2013.01); *G01M 17/02* (2013.01); *B29D 2030/0066* (2013.01); *Y02P 90/02* (2015.11)

(58) Field of Classification Search
CPC . B60C 25/0554; B60C 13/001; B60C 25/007; B29D 2030/0066; G01M 17/02; Y02P 90/02; G06F 16/24; G06K 7/10861; G06K 7/1417; G06Q 10/06
See application file for complete search history.

(56) References Cited

U.S. PATENT DOCUMENTS 7,772,521 B2 * 8/2010 Smith, Jr. .......... B23K 26/0838
219/121.68

FOREIGN PATENT DOCUMENTS

| JP | 06-084002 | 3/1994 |
|---|---|---|
| JP | 2010-107294 | 5/2010 |

* cited by examiner

*Primary Examiner* — Rick K Chang
(74) *Attorney, Agent, or Firm* — Rankin, Hill & Clark LLP

(57) ABSTRACT

A tire management method with which specific information of a tire can be acquired at arbitrary timing in a manufacturing process of a vehicle is provided. The tire management method is a method of managing a tire group including a plurality of tires 1 on each of which a first mark M1 and a second mark M2 are provided on specific positions of a side surface, the method including: a step of associating, with respect to each of the tires included in the tire group, specific information of the tire and mark positional information (θ12, r1, and r2) related to positions of the marks M1 and M2, and recording these into a computer 2; a step of acquiring mark positional information of a tire selected from the tire group; and a step of acquiring, by using the computer 2, specific information associated with the previously-acquired mark positional information.

10 Claims, 7 Drawing Sheets

FIG. 4

| MARK POSITIONAL INFORMATION (θ12[deg],r1[mm],r2[mm]) | TIRE-SPECIFIC INFORMATION | | | | |
|---|---|---|---|---|---|
| | SERIAL NUMBER | TIRE TYPE | MANUFACTURING CONDITION (TEMPERATURE, TIME,⋯) | INSPECTION DATA (RFV,LFV,⋯) | INSPECTION DATA (PLY STEER) | ⋯ |
| θa, ra1, ra2 | 127649 | H4581 | (160,30,⋯) | (OK,OK,⋯) | OK | ⋯ |
| θb, rb1, rb2 | 125874 | H4581 | (160,30,⋯) | (OK,OK,⋯) | OK | ⋯ |
| ⋮ | ⋮ | ⋮ | ⋮ | ⋮ | ⋮ | ⋮ |

FIG. 8

| FIRST MARK POSITIONAL INFORMATION (θ12[deg],r1[mm],r2[mm]) | SECOND MARK POSITIONAL INFORMATION (θB1[deg]) | TIRE-SPECIFIC INFORMATION | | | | |
|---|---|---|---|---|---|---|
| | | SERIAL NUMBER | TIRE TYPE | MANUFACTURING CONDITION (TEMPERATURE, TIME,···) | INSPECTION DATA (RFV,LFV,···) | INSPECTION DATA (PLY STEER) |
| θa, ra1, ra2 | θx | 1277649 | H4581 | (160,30,···) | (OK,OK,···) | OK |
| θb, rb1, rb2 | θy | 125874 | H4581 | (160,30,···) | (OK,OK,···) | OK |
| ⋮ | ⋮ | ⋮ | ⋮ | ⋮ | ⋮ | ⋮ |

TIRE MANAGEMENT METHOD

This application is based on and claims the benefit of priority from Japanese Patent Application No. 2017-031068, filed on 22 Feb. 2017, the content of which is incorporated herein by reference.

BACKGROUND OF THE INVENTION

Field of the Invention

The present invention relates to a tire management method. More specifically, the present invention relates a tire management method of managing a tire group including a plurality of tires in each of which first and second marks are provided on a side surface.

Related Art

Various kinds of information related to the tire is put on a tire shipped from a tire manufacturing factory. For example, a light point (yellow circle in many cases) indicating a position of the lightest point in a whole circumference, an RFV point (red circle in many cases) indicating a position with the largest radius or highest strength in the whole circumference, and the like are put on a sidewall of a tire (see, for example, Japanese Unexamined Patent Application, Publication No. H06-84002). Also, there is a case where a two-dimensional code (such as a QR code (registered trademark)) is attached to a bead part of a tire (see, for example, Japanese Unexamined Patent Application, Publication No. 2010-107294). This two-dimensional code is a coded serial number that is specific for a tire and that is linked to inspection information related to a result of tire inspection performed in the tire manufacturing factory. The inspection information can be indirectly acquired when the two-dimensional code is read by a reader.

Incidentally, as steps specifically related to an undercarriage, (A) a step of manufacturing a tire-wheel assembly by using a tire shipped from a tire manufacturing factory, (B) a step of assembling the manufactured tire-wheel assembly to each axle, (C) a step of measuring and adjusting alignment, and (D) a step of adjusting handle angle are in a manufacturing process of a vehicle.

SUMMARY OF THE INVENTION

As described above, tire-specific information, which varies depending on a tire, such as a light point, an RFV point, and a two-dimensional code linked to inspection information is put on a tire shipped from a tire manufacturing factory. However, among these pieces of tire-specific information, only the light point and the RFV point are information used in a current manufacturing process of a vehicle. Also, only the step of (A) among the above four steps is a step using the light point and the RFV point. This is because the two-dimensional code is covered and cannot be seen when the tire is assembled to a wheel.

Thus, in a case of utilizing inspection information of a tire in the steps of (B) to (D), it is necessary to print this inspection information at a position other than the bead part of the tire or to securely perform flow management. However, in the former case, there is a possibility that performance of the tire is changed or cost is increased due to the printing. Also, in the flow management, in a case where the order of tires is irregularly changed, this cannot be recognized and inspection information may not be used effectively.

The present invention is to provide a tire management method with which specific information of a tire can be acquired at arbitrary timing in a manufacturing process of a vehicle.

(1) A tire management method of the present invention is a method of managing a tire group including a plurality of tires (such as tire 1 described later) on each of which a first mark (such as first mark M1 described later) and a second mark (such as second mark M2 or third mark M3 described later) are provided at specific positions on a side surface, the method including: a recording step (such as S2 to S4 in FIG. 1 described later) of associating, with respect to each of the tires included in the tire group, specific information of the tire and mark positional information (such as mark positional information ($\theta 12$, r1, and r2) described later) related to positions of the first and second marks provided on the tire, and recording these into a recording medium (such as computer 2 described later); a mark positional information acquiring step (such as S11 in FIG. 1 described later) of acquiring mark positional information of a tire selected from the tire group; and an individual identifying step (such as S12 in FIG. 1 described later) of acquiring, by using the recording medium, specific information associated with the acquired mark positional information.

(2) In this case, with a center of a tire as an origin (such as origin O described later), the mark positional information preferably includes an angle (such as angle $\theta 12$ described later) formed by a line passing through the first mark and the origin (such as line L1 described later) and a line passing through the second mark and the origin (such as line L2 described later).

(3) In this case, the mark positional information preferably includes a length from the origin to the first mark (such as length r1 described later) and a length from the origin to the second mark (such as length r2 described later), or one of these lengths.

(4) In this case, it is preferred that one of the first mark and the second mark indicates a position of a light point of a tire, and the other indicates a position of an RFV point of the tire.

(5) In this case, it is preferred that the first mark indicates a position of a light point or a position of an RFV point of a tire, and the second mark indicates a position of a predetermined feature point in a brand mark of the tire.

(6) A tire management method of the present invention is a method of managing a tire group (such as tire group or tire-wheel assembly group described later) including a plurality of tires (such as tire 1 described later) in each of which a first mark (such as first mark M1 described later) and a second mark (such as second mark M2 described later) are provided at specific positions on a side surface, the method including: a first recording step (such as S32 to S34 in FIG. 6 described later) of associating, with respect to each of the tires included in the tire group, specific information of the tire and first mark positional information (such as first mark positional information ($\theta 12$, r1, and r2) described later) related to positions of the first and second marks provided on the tire, and recording these into a recording medium; a wheel assembling step (such as S35 in FIG. 6 described later) of assembling a wheel to each of the tires included in the tire group; a second recording step (such as S41 to S42 in FIG. 6 described later) of acquiring, with respect to a tire which is included in the tire group and on which the wheel assembling step is performed, second mark positional information (such as second mark positional information ($\theta B1$)

described later) related to a relative positional relationship between a valve thereof (such as valve B described later) and at least one of the first mark and the second mark, and the first mark positional information, associating the second mark positional information and tire-specific information associated with the first mark positional information, and recording these into the recording medium; a mark positional information acquiring step (such as S51 in FIG. 6 described later) of acquiring second mark positional information of a tire selected from the tire group; and an individual identifying step (such as S52 in FIG. 6 described later) of acquiring, by using the recording medium, specific information associated with the acquired second mark positional information.

(1) A tire management method of the present invention includes a recording step, a mark positional information acquiring step, and an individual identifying step. With respect to each tire included in a tire group, specific information of the tire and mark positional information related to positions of first and second marks provided on the tire are associated with each other and recorded into a recording medium in the recording step. Mark positional information of a tire selected from the tire group is acquired in the mark positional information acquiring step. In the individual identifying step, specific information associated with the acquired mark positional information is acquired by utilization of the recording medium on which recording is performed in the preceding recording step. That is, in the present invention, information related to the positions of the first and second marks put on specific positions on each of many tires and specific information of a tire are previously associated with each other and recorded into a recording medium. Thus, since it is possible to acquire specific information of a tire at arbitrary timing in a case of assembling the tire to a wheel or a vehicle in a subsequent manufacturing process of a vehicle, it is possible to appropriately assembling the tire to the vehicle by effectively using the specific information of the tire. Also, in the present invention, since it is only necessary to acquire information related to the positions of the first and second marks in a case of acquiring specific information of a tire, it is possible to acquire specific information of a tire by using existing equipment.

(2) In the tire management method of the present invention, in a case where a center of a tire is an origin, an angle formed by a line passing through a first mark and the origin, and a line passing through a second mark and the origin is used as mark positional information. The angle formed by the line passing through the first mark and the line passing through the second mark varies depending on a tire. By using this as mark positional information, it is possible to appropriately identify a tire.

(3) In the tire management method of the present invention, a length from the origin to the first mark and a length from the origin to the second mark, or one of these lengths are used as mark positional information in addition to the above angle. Similarly to the above angle, the length from the origin to each mark varies depending on a tire. Thus, by using this as mark positional information, it is possible to appropriately identify more tires.

(4) In the tire management method of the present invention, information related to positions of a light point and an RFV point of a tire is used as mark positional information. Since this light point and this RFV point are provided at least on many tires manufactured in Japan, the tire management method of the present invention can be applied to many tires.

(5) In the tire management method of the embodiment of the present invention, information related to the position of the light point or the RFV point of a tire and a position of a predetermined feature point in a brand mark of the tire is used as mark positional information. Since this light point and this RFV point of a tire are provided at least on many tires manufactured in Japan and a brand mark is provided on almost all tires in and outside Japan, the tire management method of the present invention can be applied to many tires.

(6) The tire management method of the present invention includes a first recording step, a wheel assembling step, a second recording step, a mark positional information acquiring step, and an individual identifying step. In the first recording step, with respect to each tire included in a tire group, specific information of the tire, and first mark positional information related to the positions of the first and second marks provided on the tire are associated with each other and recorded into a recording medium. A wheel is assembled to each tire in the wheel assembling step. In the second recording step, with respect to a tire to which a wheel has been assembled, second mark positional information related to a relative positional relationship between a valve thereof and at least one of the first mark and the second mark, and the first mark positional information are acquired, and this second mark positional information and tire-specific information associated with the first mark positional information are associated with each other and recorded into the recording medium. Second mark positional information of a tire selected from the tire group is acquired in the mark positional information acquiring step. In the individual identifying step, specific information associated with the acquired second mark positional information is acquired by utilization of the recording medium on which recording is performed in the preceding second recording step. That is, in the present invention, information related to positions of a valve, the position of which is determined when a wheel is assemble to a tire, and at least one of first and second marks, and specific information of the tire are previously associated with each other and recorded into a recording medium. Thus, since it is possible to acquire the specific information of the tire at arbitrary timing in a subsequent manufacturing process of a vehicle, it is possible to appropriately assemble the tire to the vehicle by effectively using the specific information of the tire. Also, in the present invention, it is only necessary to acquire information related to the positions of the valve and the first and second marks in a case of acquiring specific information of a tire, and it is possible to acquire the specific information of the tire by using existing equipment.

BRIEF DESCRIPTION OF THE DRAWINGS

FIG. 4 is a view illustrating an example of a database in which mark positional information and tire-specific information are associated with each other.

FIG. 8 is a view illustrating an example of a second database in which first and second mark positional information and tire-specific information are associated with each other.

DETAILED DESCRIPTION OF THE INVENTION

First Embodiment

In the following, a first embodiment of the present invention will be described in detail with reference to the drawings.

Figure 1:
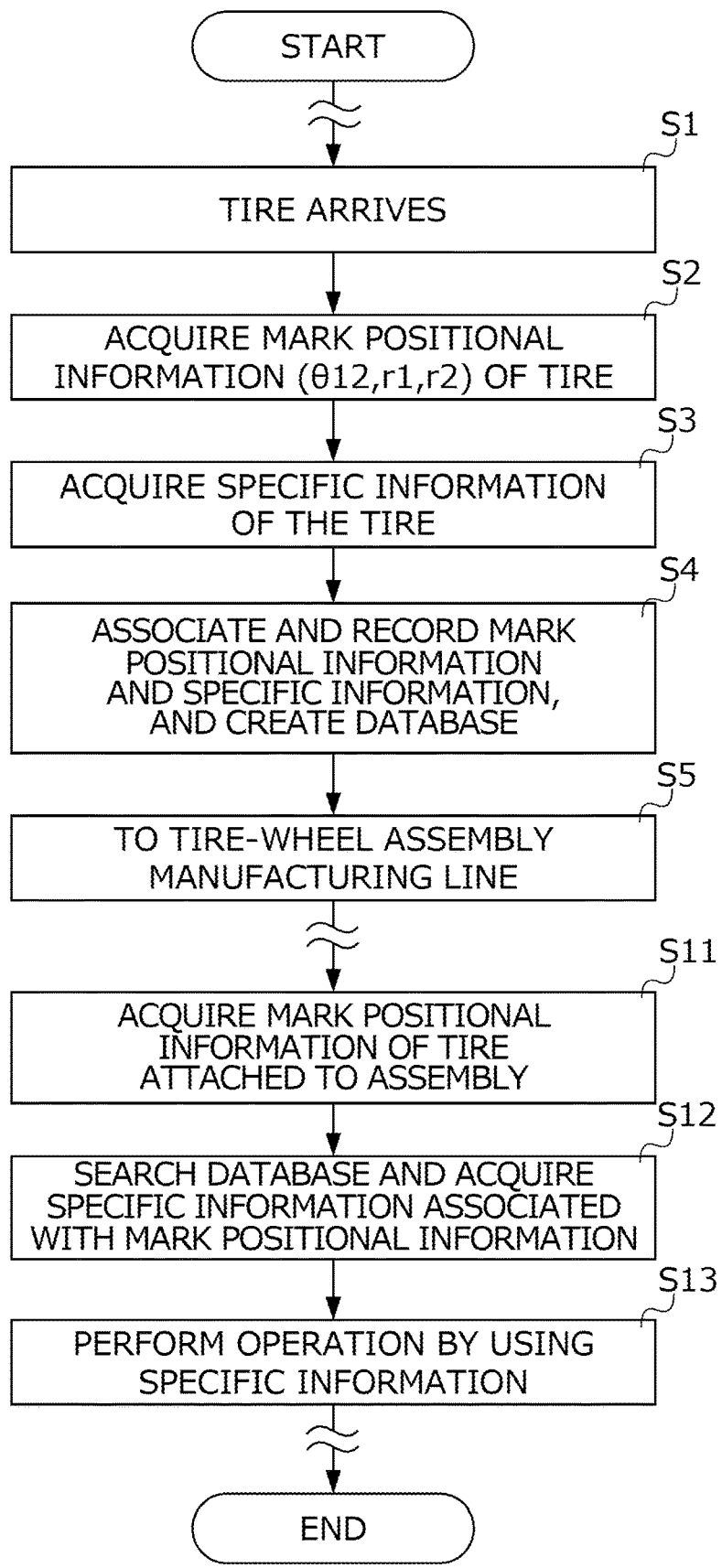
FIG. 1 is a flowchart illustrating a part of a vehicle manufacturing procedure into which a tire management method according to a first embodiment of the present invention is incorporated.

FIG. 1 is a flowchart illustrating a part of a vehicle manufacturing procedure in which a tire management method according to the present embodiment is incorporated.

Figure 2:
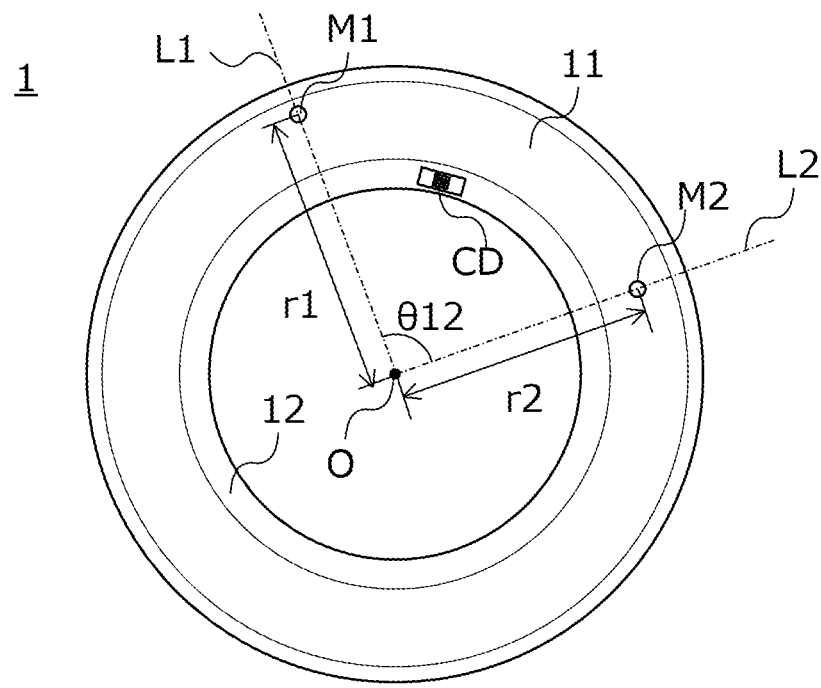
FIG. 2 is a side view of a tire manufactured in a factory.

A plurality of tires manufactured in a factory arrives in S1. As illustrated in FIG. 2, a first mark M1 indicating a position of a light point of a tire 1, and a second mark M2 indicating a position of an RFV point of the tire are put on specific positions of a sidewall 11 of the tire 1 manufactured in the factory. Note that the first mark M1 is a yellow circle, and the second mark M2 is a red circle. These marks M1 and M2 can be identified. These marks M1 and M2 are put by carrying out inspection in the manufacturing factory of a tire.

Also, as illustrated in FIG. 2, a specific two-dimensional code CD is put on a rim part 12, which is a part covered by a wheel when assembled to the wheel, in the tire 1 manufactured in the factory. This two-dimensional code CD is, for example, a QR code (registered trademark) and is a coded serial number that is specific for a tire and linked to inspection information related to a result of tire inspection performed in the tire manufacturing factory.

Figure 3:
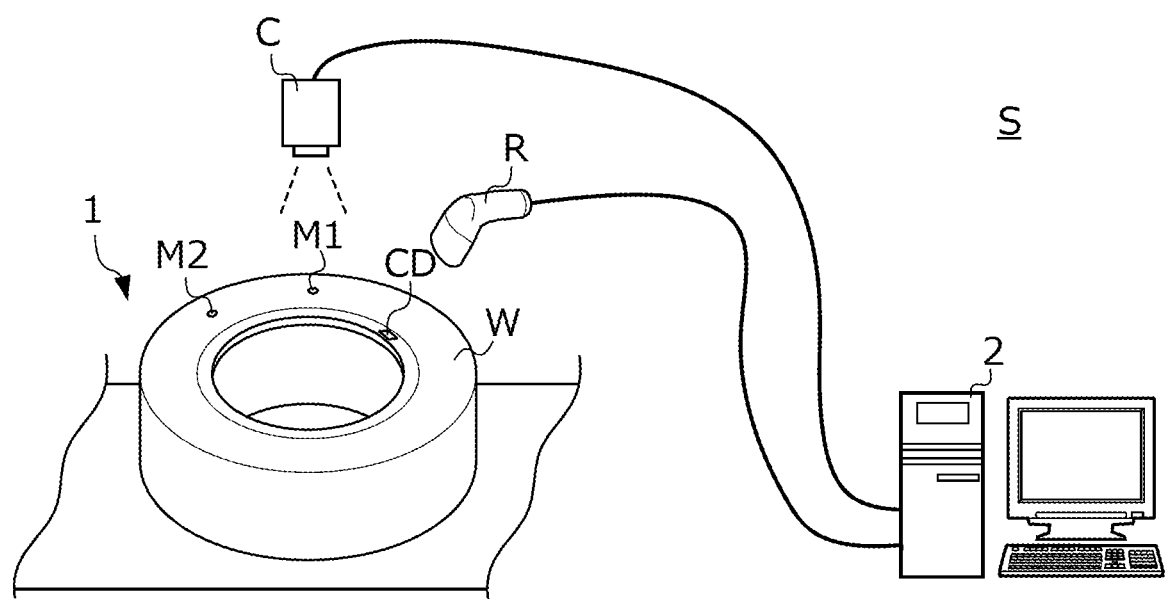
FIG. 3 is a view schematically illustrating a configuration of a tire management system.

Then, in S2 to S4, a database is created with respect to a tire group, which arrives in S1, by utilization of a tire management system S illustrated in FIG. 3. The tire management system S includes a computer 2, a camera C that photographs an image of a side surface of a tire 1 and transmits image data to the computer 2, and a code reader R that reads the two-dimensional code CD put on the tire 1 and transmits the read code data to the computer 2.

More specifically, in S2, the computer 2 photographs, with the camera C, an image of a side surface of one tire 1 selected from a plurality of tires included in the tire group, and performs predetermined image processing with respect to the image data of the side surface of this tire 1, whereby the computer 2 acquires mark positional information related to positions of the first and second marks of the tire. Here, for example, as illustrated in FIG. 2, in a case where a center of the selected tire 1 is an origin O, the mark positional information acquired by the computer 2 in S2 includes three values that are an angle θ12 formed by a line L1 passing through the first mark M1 and the origin O and a line L2 passing through the second mark M2 and the origin O, a length r1 from the origin O to the first mark M1, and a length r2 from the origin O to the second mark M2. Since the positions of the marks M1 and M2 put on a tire manufactured in a factory are specific to the tire, a tire can be identified by this mark positional information (θ12, r1, and r2).

Note that in the present embodiment, a case where all of the angle θ12, the length r1, and the length r2 are used as the mark positional information will be described. However, the present invention is not limited to this. For example, only the angle θ12 may be mark positional information, or the angle θ12 and the length r1, or the angle θ12 and the length r2 may be mark positional information.

Then, in S3, the computer 2 acquires a serial number and the like of a tire 1 by reading the two-dimensional code CD of the tire 1 with the code reader R, and acquires specific information of the tire, which information is linked to the serial number, via a network (not illustrated). This specific information of the tire includes a serial number, a tire type, a manufacturing condition, various kinds of inspection data, and the like. Also, the inspection data includes information, which is related to uniformity of a tire, such as radial force variation (RFV), lateral force variation (LFV), and lateral force (in normal rotation and in reverse rotation), and information such as ply steer and conicity calculated from these.

Then, in S4, the computer 2 associates the mark positional information about a predetermined tire which information is acquired in S2 and the specific information about the tire which information is acquired in S3, and records these into a recording medium thereof. The tire management system S repeats the processing in S2 to S4 with respect to each tire included in the tire group, whereby a database in which mark positional information and tire-specific information are associated with each other is created in the recording medium of the computer 2, as illustrated in FIG. 4.

Then, in S5, a tire already recorded in the database is conveyed to a tire-wheel assembly manufacturing line (not illustrated) and attached to a wheel (not illustrated) in this line.

Subsequently, in S11 to S12, one of a plurality of tire-wheel assemblies manufactured in the tire-wheel assembly manufacturing line is selected, and specific information of a tire attached to this assembly is acquired with the tire management system S.

More specifically, in S11, the computer 2 photographs an image of a side surface of one selected tire-wheel assembly with the camera C, and acquires mark positional information (θ12, r1, and r2) of a tire attached to this assembly. In S12, the computer 2 searches the database created in the recording medium in S4 and acquires tire-specific information associated with the mark positional information acquired in S11. Then, in S13, an operation is performed by utilization of the acquired tire-specific information.

The following effects are acquired according to the tire management method of the present embodiment.

(1) The tire management method includes a recording step of creating a database (S2 to S4), a mark positional information acquiring step of acquiring mark positional information (S11), and an individual identifying step of acquiring specific information and identifying a tire (S12). In the step of creating a database, a database illustrated in FIG. 4 is created with respect to each tire included in a tire group by specific information of the tire and mark positional information related to positions of marks M1 and M2 provided on the tire being associated with each other and recorded into the recording medium of the computer 2. In the step of acquiring mark positional information, mark positional information of a tire attached to a tire-wheel assembly is acquired. Also, in the step of identifying a tire, specific information associated with the acquired mark positional information is acquired by a search in the database created in the recording medium of the computer 2. That is, in the present embodiment, information related to the positions of the marks M1 and M2 put on specific positions of each of many tires and specific information of the tire are previously associated with each other and recorded into the recording medium of the computer 2, whereby it is possible to acquire specific information of a tire at arbitrary timing in assembling the tire to a wheel or a vehicle in a subsequent manufacturing process of the vehicle. Thus, it is possible to appropriately assemble the tire to the vehicle by using the specific information of the tire effectively.

Also, in the present embodiment, in a case of acquiring specific information of a tire, it is only necessary to acquire information related to the positions of the first mark M1 and the second mark M2. Thus, it is possible to acquire specific information of a tire by using existing equipment.

(2) In the tire management method of the present embodiment, in a case where a center of a tire 1 is an origin O, an angle θ12 formed by a line L1 passing through the first mark M1 and the origin O and a line L2 passing through the second mark M2 and the origin O is used as mark positional information. This angle θ12 varies depending on a tire. By using this as the mark positional information, it is possible to appropriately identify a tire.

(3) In the tire management method of the present embodiment, a length r1 from the origin O to the first mark M1 and a length r2 from the origin O to the second mark M2 are used as mark positional information in addition to the angle θ12. Similarly to the above angle θ12, the lengths r1 and r2 vary depending on a tire. Thus, it is possible to appropriately identify more tires by using these as the mark positional information.

(4) In the tire management method of the present embodiment, the positions of the first mark M1 indicating a position of a light point of a tire and the second mark M2 indicating a position of an RFV point are used as mark positional information. Since this light point and this RFV point are provided at least on many tires manufactured in Japan, the tire management method of the present embodiment can be applied to many tires.

Second Embodiment

Next, a second embodiment of the present invention will be described in detail with reference to the drawings. In a tire management method according to the present embodiment, contents of processing in S2 to S4, and S11 in a flowchart in FIG. 1 are different from those in the tire management method according to the first embodiment. More specifically, in the tire management method according to the present embodiment, a configuration of mark positional information is different from that in the tire management method according to the first embodiment. In the following, only a part different from the first embodiment will be described and a detailed description of the same part is omitted.

Figure 5:
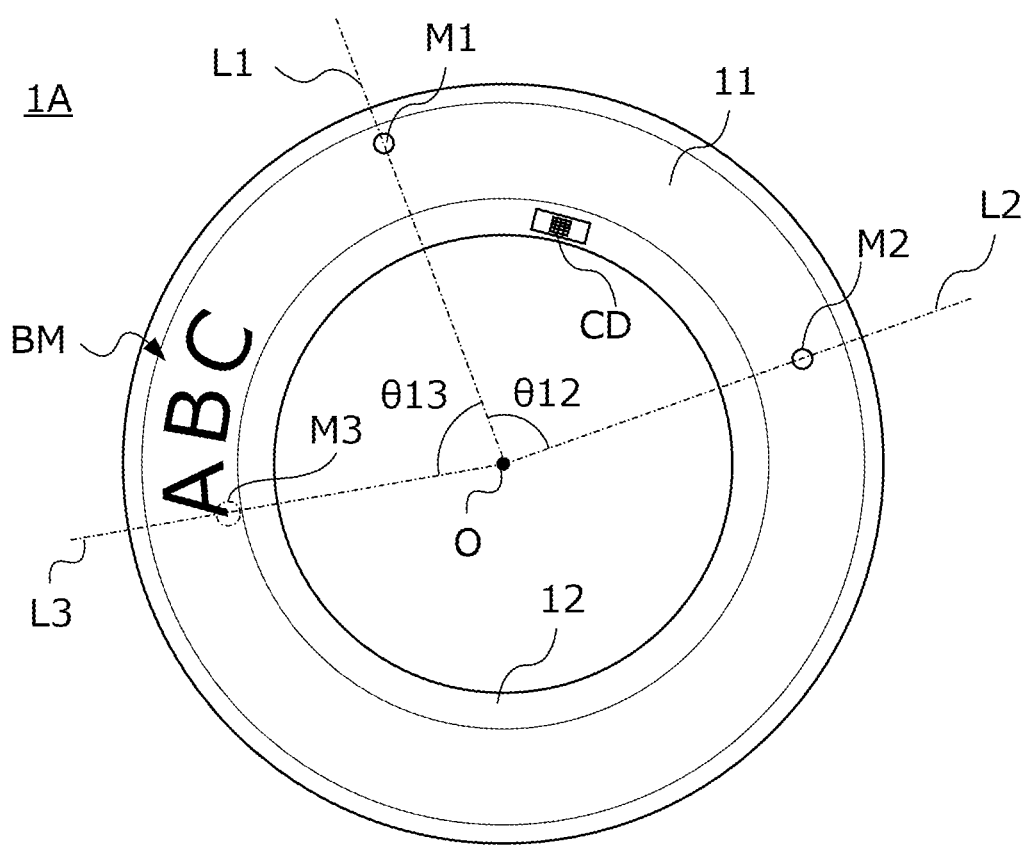
FIG. 5 is a side view of a tire to be managed in a tire management method according to a second embodiment of the present invention.

FIG. 5 is a side view of a tire 1A included in a tire group to be managed in the tire management method according to the present embodiment. As illustrated in FIG. 5, at a specific position on a sidewall 11 of the tire 1A manufactured in a factory, characters "ABC" indicating a brand mark BM are formed in addition to a first mark M1 and a second mark M2. In the present embodiment, a part, which is placed at a leading end in a moving direction of the tire 1A, in such a brand mark BM is defined as a third mark M3.

Incidentally, in the tire management method according to the first embodiment, information related to positions of the first mark M1 and the second mark M2 provided on a side surface of a tire 1 illustrated in FIG. 2 is used as mark positional information. More specifically, in the tire management method according to the first embodiment, an angle θ12 formed by a line L1 passing through the first mark M1 and a line L2 passing through the second mark M2 is one piece of the mark positional information. In steps from S2 to S4 in FIG. 1, the mark positional information including this angle θ12, and specific information of a tire are associated with each other and recorded into a recording medium of a computer 2. Also, in the tire management method according to the first embodiment, the mark positional information including the angle θ12 is acquired in a step of S11 in FIG. 1, and tire-specific information is acquired from this mark positional information in a step of S12.

On the other hand, as illustrated in FIG. 5, in the tire management method according to the present embodiment, information related to a position of the third mark M3 is used as mark positional information in addition to the first mark M1 and the second mark M2 provided on a side surface of a tire LA. More specifically, in a recording step in the tire management method according to the present embodiment, instead of the steps in S2 to S4 in FIG. 1, an angle θ13 formed by the line L1 and a line L3 passing through the third mark M3 is used as mark positional information in addition to the angle θ12 formed by the line L1 passing through the first mark M1 and the line L2 passing through the second mark M2, and mark positional information including these angles θ12 and θ13, and specific information of a tire are associated with each other and recorded into a recording medium of a computer 2. Also, in a mark positional information acquiring step in the tire management method according to the present embodiment, instead of the step in S11 in FIG. 1, the mark positional information including the angle θ12 and the angle θ13 is acquired. Also, in an individual identifying step in the tire management method according to the present embodiment, instead of the step in S12 in FIG. 1, tire-specific information is acquired from the mark positional information including the angle θ12 and the angle θ13.

Note that as mark positional information, an angle formed by the line L2 passing through the second mark M2 and the line L3 passing through the third mark M3 may be used as one piece of the mark positional information instead of the angle θ13 described above.

The following effect is acquired according to the tire management method of the present embodiment.

(5) In the tire management method of the present embodiment, information related to the angle formed by the first mark M1 indicating a position of a light point of a tire or the second mark M2 indicating a position of an RFV point thereof, and a third mark M3 that is a predetermined feature point in a brand mark of the tire is used as mark positional information. Since this light point and this RFV point of a tire are provided at least on many tires manufactured in Japan and the brand mark is provided on almost all tires in and outside Japan, the tire management method of the present embodiment can be applied to many tires.

Third Embodiment

Next, a third embodiment of the present invention will be described in detail with reference to the drawings.

Figure 6:
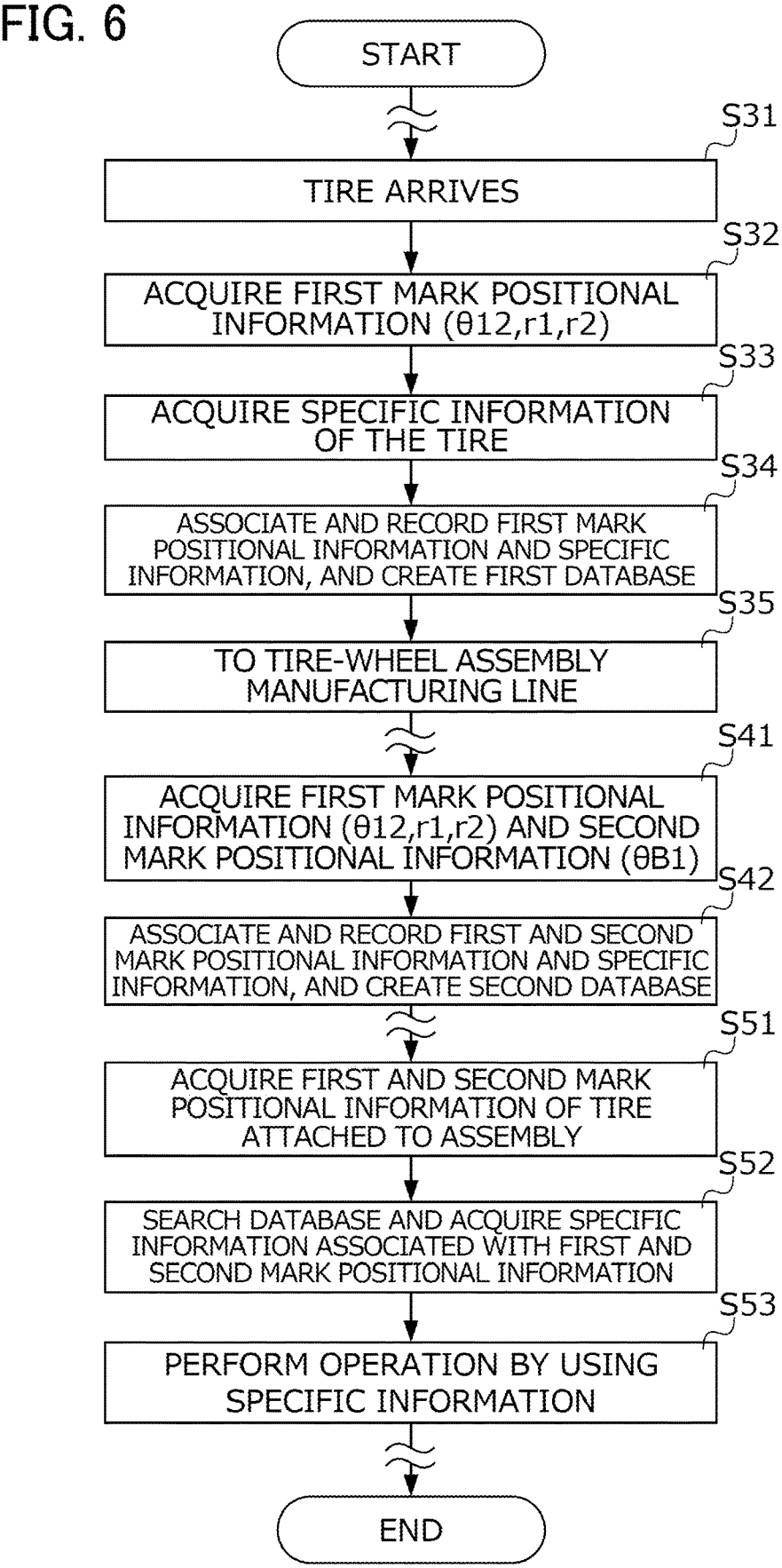
FIG. 6 is a flowchart illustrating a part of a vehicle manufacturing procedure into which a tire management method according to a third embodiment of the present invention is incorporated.

FIG. 6 is a flowchart illustrating a part of a vehicle manufacturing procedure in which a tire management method according to the present embodiment is incorporated.

In S31, a plurality of tires manufactured in a factory arrives. Since the tires that arrive here are the same as those described with reference to FIG. 2, a detailed description thereof is omitted.

Then, in S32 to S34, a first database is created with respect to the tire group that arrives in S31 by a tire management system S described with reference to FIG. 3. More specifically, in S32, the computer 2 photographs, with a camera C, an image of a side surface of one tire 1 selected from a plurality of tires included in the tire group, and performs predetermined image processing with respect to image data of the side surface of this tire, whereby the computer 2 acquires first mark positional information including three values that are an angle $\theta12$ formed by a line L1 passing through a first mark M1 and an origin O and a line L2 passing through a second mark M2 and the origin O, a length r1 from the origin O to the first mark M1, and a length r2 from the origin O to the second mark M2. Then, in S33, the computer 2 acquires specific information of a tire by a procedure similar to that of the processing in S3 in FIG. 1. Then, in S34, the computer 2 associates the first mark positional information about a predetermined tire which information is acquired in S32 and the specific information about the tire which information is acquired in S33, records these into a recording medium thereof, and creates a first database which is illustrated in FIG. 4 and in which the first mark positional information and the tire-specific information are associated with each other.

Then, in S35, a tire already recorded in the first database is conveyed to a tire-wheel assembly manufacturing line (not illustrated) and attached to a wheel in this line.

Figure 7:
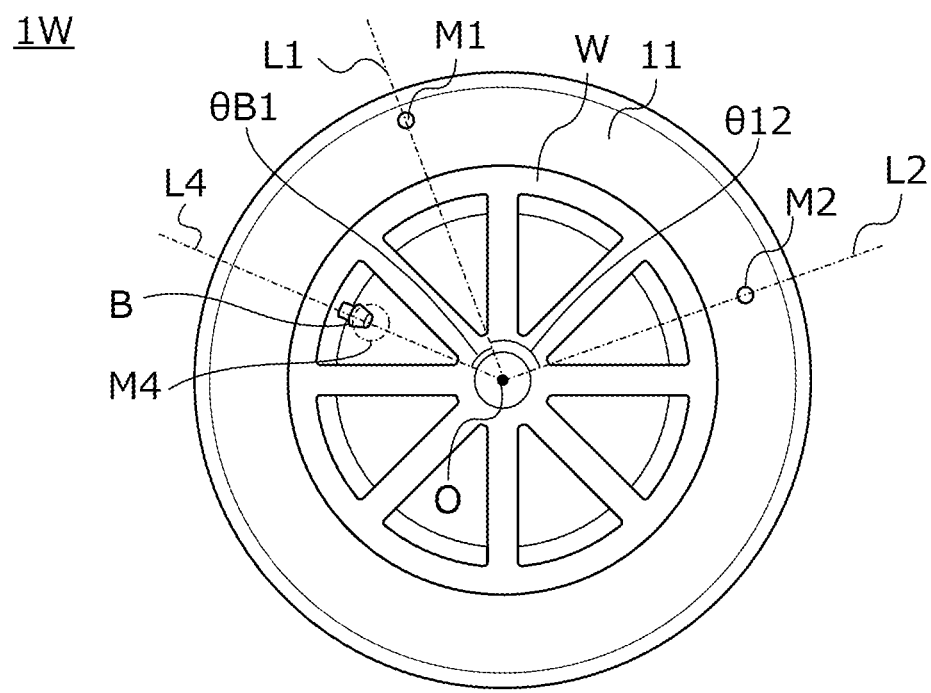
FIG. 7 is a side view of a tire-wheel assembly.

FIG. 7 is a side view of a tire-wheel assembly 1W manufactured in the tire-wheel assembly manufacturing line. The tire-wheel assembly 1W is formed by assembling a cylindrical wheel W to a center of the tire 1. Also, in the tire-wheel assembly 1W, a two-dimensional code CD (see FIG. 2) put on a rim part 12 of the tire 1 is covered by the wheel W. Also, when the wheel W is assembled to the tire 1, a relative position of a valve B with respect to the tire 1 is fixed. Note that in the following, a valve cap provided at a leading end part of this valve B is defined as a fourth mark M4.

Referring back to FIG. 6, in S41 to S42, a second database is created with respect to a tire-wheel assembly group including a plurality of tires 1, to each of which wheel W is assembled, by utilization of a tire management system S described with reference to FIG. 3. More specifically, in S41, the computer 2 photographs, with a camera C, an image of a side surface of one tire-wheel assembly 1W selected from a plurality of tire-wheel assemblies included in a tire-wheel assembly group, and performs predetermined image processing with respect to image data of the side surface of this tire, whereby the computer 2 acquires first mark positional information including three values that are an angle $\theta12$, a length r1, and a length r2, and second mark positional information including a value of an angle $\theta B1$ formed by a line L4 passing through a fourth mark M4 and the origin O and a line L1 passing through a first mark M1 and the origin O. Then, in S42, the computer 2 specifies, on the first database, a tire attached to a tire-wheel assembly by a search in the first database from the first mark positional information ($\theta12$, r1, and r2) acquired here, and creates a second database by adding second mark positional information ($\theta B1$) to a field of the specified tire. The tire management system S repeats the processing in S41 to S42 with respect to each tire-wheel assembly included in the tire-wheel assembly group, whereby a second database in which first mark positional information, second mark positional information, and tire-specific information are associated with each other is created in the recording medium of the computer 2, as illustrated in FIG. 8.

Subsequently, in S51 to S52, one is selected from the tire-wheel assembly group after the recording step in S41 to S42, and specific information of a tire attached to this tire-wheel assembly is acquired by utilization of the tire management system S.

More specifically, in S51, the computer 2 photographs, with a camera C, an image of a side surface of one selected tire-wheel assembly, and acquires first mark positional information ($\theta12$, r1, and r2) and second mark positional information ($\theta B1$) of this tire-wheel assembly. In S52, the computer 2 searches the second database created in the recording medium in S42, and acquires tire-specific information associated with the first and second mark positional information acquired in S51. Then, in S53, operation is performed by utilization of the acquired tire-specific information.

The following effect is acquired according to the tire management method of the present embodiment.

(6) The tire management method includes a first recording step of creating a first database (S32 to S34), a wheel assembling step (S35), a second recording step of creating a second database (S41 to S42), a mark positional information acquiring step of acquiring first and second mark positional information (S51), and an individual identifying step of acquiring specific information and identifying a tire (S52). In the first recording step, with respect to each tire included in a tire group, specific information of the tire and first mark positional information related to positions of the marks M1 and M2 provided on the tire are associated with each other and recorded into a recording medium of the computer 2, and a first database is created. In the wheel assembling step, a wheel is assembled to each tire. In the second recording step, with respect to a tire-wheel assembly, second mark positional information related to a relative positional relationship between a fourth mark M4 prescribed in a valve B thereof and at least one of the marks M1 and M2, and first mark positional information are acquired, and this second mark positional information, and tire-specific information associated with the first mark positional information are associated with each other and recorded into the recording medium of the computer 2, whereby a second database is created. In the mark positional information acquiring step, second mark positional information of a tire-wheel assembly selected from a tire-wheel assembly group is acquired. In the individual identifying step, specific information associated with the acquired second mark positional information is acquired by utilization of the second database created in the preceding second recording step. That is, in the present embodiment, information related to positions of the valve B, the position of which is determined when a wheel is assembled to a tire, and at least one of the two marks M1 and M2, and specific information of the tire are previously associated with each other and recorded into the recording medium, and the second database is created. Thus, since it is possible to acquire the specific information of the tire at arbitrary timing in a subsequent manufacturing process of a vehicle, it is possible to appropriately assemble the tire to the vehicle by effectively using the specific information of the tire. Also, in the present embodiment, in a case of acquiring specific information of a tire, it is only necessary to acquire information related to the positions of the valve B and the marks M1 and M2. Thus, it is possible to acquire specific information of a tire by using existing equipment.

What is claimed is:

1. A tire management method of managing a tire group including a plurality of tires on each of which a first mark and a second mark are provided on specific positions of a side surface, the method comprising:
 a recording step of associating, with respect to each of the tires included in the tire group, specific information of the tire and mark positional information related to positions of the first and second marks provided on the tire, and recording these into a recording medium;
 a mark positional information acquiring step of acquiring mark positional information of a tire selected from the tire group; and
 an individual identifying step of acquiring, by using the recording medium, specific information associated with the acquired mark positional information,
 wherein the first and second marks are provided at different positions for each of the tires, and
 in the recording step, with respect to each of the tires included in the tire group, a database that associates the mark positional information with the specific information is created on the recording medium.

2. The tire management method according to claim 1, wherein in a case where a center of the tire is an origin, the mark positional information includes an angle formed by a line passing through the first mark and the origin and a line passing through the second mark and the origin.

3. The tire management method according to claim 2, wherein the mark positional information includes a length from the origin to the first mark and a length from the origin to the second mark, or one of these lengths.

4. The tire management method according to claim 3, wherein one of the first mark and the second mark indicates a position of a light point of the tire, and the other indicates a position of an RFV point of the tire.

5. The tire management method according to claim 2, wherein one of the first mark and the second mark indicates a position of a light point of the tire, and the other indicates a position of an RFV point of the tire.

6. The tire management method according to claim 2, wherein the first mark indicates a position of a light point or a position of an RFV point of the tire, and the second mark indicates a position of a predetermined feature point in a brand mark of the tire.

7. The tire management method according to claim 1, wherein one of the first mark and the second mark indicates a position of a light point of the tire, and the other indicates a position of an RFV point of the tire.

8. The tire management method according to claim 1, wherein the first mark indicates a position of a light point or a position of an RFV point of the tire, and the second mark indicates a position of a predetermined feature point in a brand mark of the tire.

9. The tire management method according to claim 1, further comprising a wheel assembling step of assembling a wheel to each of the tires after the recording step,
 wherein, in the mark positional information acquiring step, the mark positional information of the tire after the wheel assembling step is acquired.

10. The tire management method according to claim 9, wherein a two-dimensional code associated with specific information is put on a rim part of each of the tires included in the tire group,
 wherein, in the recording step, in the recording medium, the specific information acquired by reading the two-dimensional code and the mark positional information are recorded in association with each other.

\* \* \* \* \*